United States Patent [19]
Dolev et al.

[11] Patent Number: 5,161,186
[45] Date of Patent: Nov. 3, 1992

[54] SYSTEM FOR SECURE AND PRIVATE COMMUNICATION IN A TRIPLE-CONNECTED NETWORK

[75] Inventors: Danny Dolev, Jerusalem, Israel; Cynthia Dwork, Palo Alto, Calif.

[73] Assignee: International Business Machines Corporation, Armonk, N.Y.

[21] Appl. No.: 756,276

[22] Filed: Sep. 6, 1991

[51] Int. Cl.$^5$ ............................................... H04L 9/02
[52] U.S. Cl. ................................ 380/2; 340/825.01; 371/8.2; 375/38; 370/16
[58] Field of Search ................ 380/2; 370/16; 375/38; 340/825.01; 371/8.2, 67.1, 68.1, 68.2

[56] References Cited

U.S. PATENT DOCUMENTS

| | | | |
|---|---|---|---|
| 4,228,321 | 10/1980 | Flanagan | 179/1.5 S |
| 4,365,247 | 12/1982 | Bargeton et al. | 340/825.01 |
| 4,561,088 | 12/1985 | Champlin et al. | 370/16 |
| 4,567,600 | 1/1986 | Massey et al. | 375/2.1 |
| 4,578,532 | 3/1986 | Markwitz | 178/22.13 |
| 4,677,670 | 6/1987 | Henderson | 380/23 |
| 4,745,597 | 5/1988 | Morgan et al. | 370/87 |
| 4,794,590 | 12/1988 | Yano | 370/60 |
| 4,802,220 | 1/1989 | Marker, Jr. | 380/33 |
| 4,803,725 | 2/1989 | Horne | 380/44 |
| 4,811,357 | 3/1989 | Betts | 375/1 |
| 4,864,568 | 9/1989 | Sato et al. | 340/825.01 |
| 4,924,513 | 5/1990 | Herbison | 380/21 |

FOREIGN PATENT DOCUMENTS

| | | |
|---|---|---|
| 57-112151 | 7/1982 | Japan . |
| 61-82546 | 4/1986 | Japan . |
| 61-82547 | 4/1986 | Japan . |

OTHER PUBLICATIONS

"Perfectly Secure Message Transmission", IEEE 1990 article by Dolev, Dwork, Waarts & Yung (pp. 36–45).

*Primary Examiner*—Salvatore Cangialosi
*Attorney, Agent, or Firm*—Baker, Maxham, Jester & Meador

[57] ABSTRACT

An apparatus and method for secure and private communications in a triple-connected processor network. Communication of a message over at least three data paths is achieved by transmitting the message in coded form over the data paths, determining whether the message is correctly received, and if the message is not correctly received, identifying a non-faulty data path, testing remaining data paths to identify a faulty data path, and transmitting the message in coded form over remaining non-faulty data paths.

20 Claims, 4 Drawing Sheets

SYSTEM FOR SECURE AND PRIVATE COMMUNICATION IN A TRIPLE-CONNECTED NETWORK

BACKGROUND OF THE INVENTION

The present invention relates to communications between nonfaulty non-adjacent nodes in a processing network, and more particularly, to private communications between nonfaulty non-adjacent digital processors connected by at least three vertex-disjoint data paths, one of which may be faulty.

It is often necessary or desirable in communication networks to maintain security between network nodes. Given two non-adjacent nonfaulty processor nodes connected by at least three vertex-disjoint (i.e. no common intermediate path nodes) paths or wires, the ability to secretly exchange a message should not be compromised by eavesdropping. Nor should communications be degraded or compromised by a faulty line or node.

Although prior secrecy methods employing cryptography keys, cipher algorithms and predealt information are known, an efficient protocol, requiring no pre-dealt keys and relying on no computation-theoretic assumptions, would be preferable. And, as indicated, fault tolerance should be provided.

SUMMARY OF THE INVENTION

The present invention is directed to an apparatus and method for secure and private communications in a triple-connected processor network in which a single path may be faulty. To that end, the private and secure communication of a message over at least three data paths is achieved by transmitting a message in coded form over the data paths, determining whether the message is correctly received, and if the message is not correctly received, identifying a non-faulty data path, testing remaining data paths to identify a faulty data path, and transmitting the message in coded form over remaining non-faulty data paths.

DESCRIPTION OF THE PREFERRED EMBODIMENTS

Figure 1:
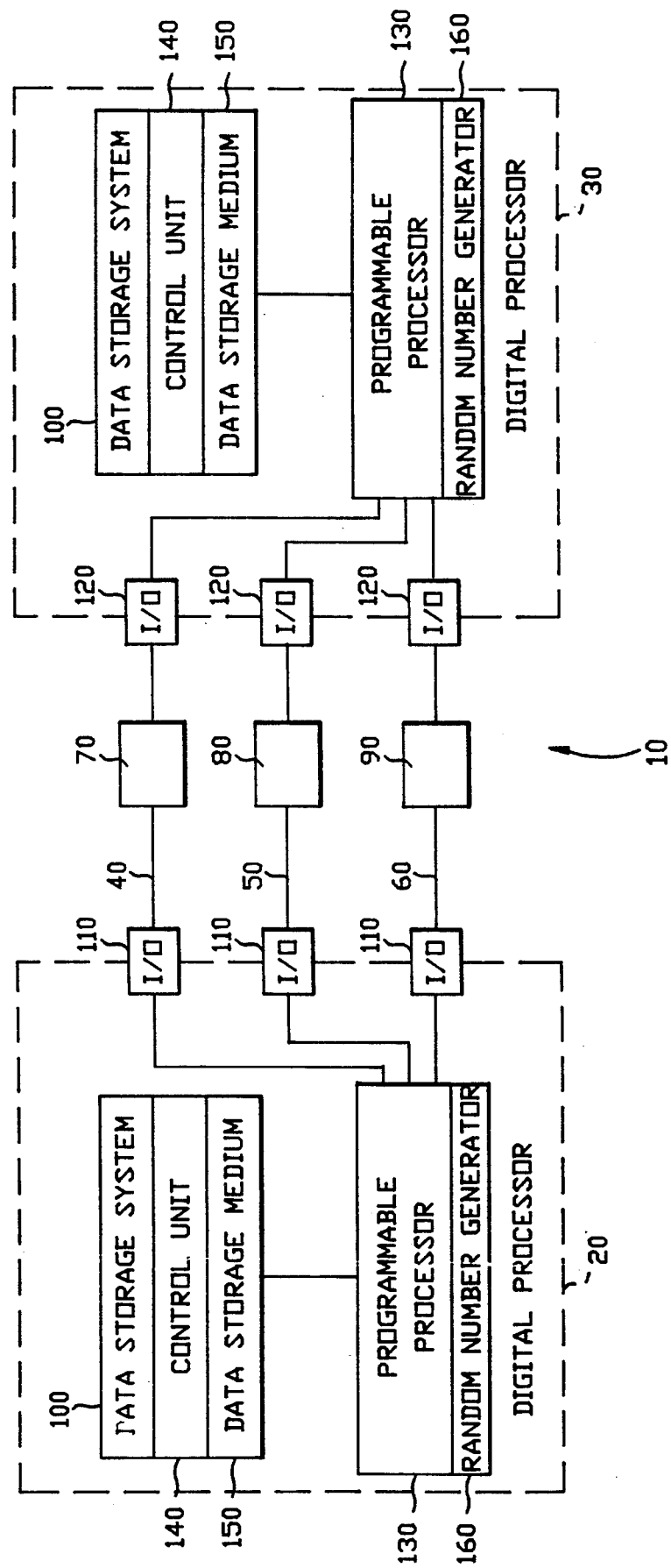
FIG. 1 is a block diagrammatic illustration of an apparatus constructed in accordance with the present invention including a pair of digital processors capable of data communication with each other and execution of a machine-executable instruction set, the processors being connected by a network of three vertex-disjoint data transmission paths.

With reference now to FIG. 1, a processor network 10 is shown as including a first non-faulty digital processor 20 and a non-faulty second digital processor 30 which is non-adjacent to the first processor. The processors 20 and 30 are connected by three vertex-disjoint data paths, one of which may be faulty, formed by wires 40, 50 and 60. In addition, the paths may include one or more processors therein as represented by way of example by nodes 70, 80 and 90. Many other configurations would also be possible. Although only three wires and intermediate processor nodes are shown, it should be understood that more wires and intermediate processor nodes could be employed. The wires 40, 50 and 60 may be any suitable data transmission medium, and the processors 70, 80 and 90 may be any network compatible processor. For example, the wires may include high-speed metallic paths or optical fibers. The network-compatible processors and the first and second processors may include system/370 products available from the assignee (IBM Corporation).

The digital processors 20 and 30 are conventional in nature and include a data storage system 100, respective input/output ports 110 and 120 in communication with the wires 40, 50 and 60, and a programmable processor 130 capable of controlling the data storage system 100 and data communications through the input/output ports 110 and 120. The processor 130 is adapted for executing a machine-executable instruction set to be described below. The data storage system 100 includes a control unit 140 and further includes either a fixed or transportable data storage medium 150 which may have stored thereon the machine-executable instruction set executable by the programmable processor 130. The storage medium 150 may thus include a floppy magnetic disk, a fixed or removeable hard magnetic or optical disk, a magnetic tape, or any other suitable storage or memory medium. There is also included in the processors 20 and 30, a pseudo random number generator 160 of conventional design.

Digital processors 20 and 30 are controlled by the executable instruction set to send a secret message over the wires 40, 50 and 60. The executable instruction set operates in accordance with a protocol described in pseudocode form below. The executable instruction set may be conveniently constructed in accordance with known techniques using any of the conventional high level programming languages such as Fortran, C, Pascal and others, followed by appropriate compiling to produce a series of machine executable statements. Assembly language or direct object code programming could also be used.

In the protocol described hereinafter, S and R represent the correct non-adjacent processors 20 and 30, respectively, connected by at least the three vertex-disjoint paths including the wires 40, 50 and 60. The protocol provides a method for controlling the processors S and R to secretly exchange a message w such that no other processor, even a faulty or an eavesdropper one will be able to obtain w, and even assuming one of the paths is faulty. No cryptography or predealt secret information is used.

The three wires 40, 50 and 60 that connect the Sender (S) to Receiver (R) are referred to as Wire 1, Wire 2, and Wire 3. It will be noted that S and R are in effect connected by a perfect public channel formed by Wire 1, Wire 2 and Wire 3. To send a message over the public channel, S need only replicate the message on all 3 wires, and R can receive by taking the majority value. Similarly, R can send to S. To send a secret message, a series of codes are utilized, as follows:

Consider the following code, CODE1, having four possible sequences of signals representing one of two values v or v':

| Wire 1 | Wire 2 | Wire 3 | Value |
|--------|--------|--------|-------|
| 0 | 0 | 0 | v |
| 1 | 0 | 0 | v' |
| 0 | 1 | 1 | v' |
| 1 | 1 | 1 | v |

In CODE1, the values "1" and "0" indicate, in commonly-understood binary form, signalling states of the wires. Hereinafter, the signalling state of a wire is referred to as the wire's "bit," which may have a binary value of 1 or 0. Now, with reference to CODE1, it will be shown in the protocol that if exactly one wire of Wire 2 and Wire 3 is faulty, such that a bit transmitted over the faulty wire inverts, then R can detect the fault by testing to determine whether the received sequence is found in the code. For example, if the sequence 000 is transmitted over wires 1-3, and 001 is received, the bit inversion caused by a fault in Wire 3 results in a sequence that does not exist in CODE1. The same result occurs if Wire 1 is faulty and flips its bit, R will not detect the fault because the resultant sequence is still within the code and will be interpreted as the value v or its inverse NOT v(v'). Wire 1 is thus referred to as the "flipper" for CODE1.

By a cyclic right shift of the rows of the table defining CODE1, CODE2 is obtained with flipper Wire 2. By a second cyclic right shift, CODE3 is obtained with flipper Wire 3, as shown below.

| Wire 1 | Wire 2 | Wire 3 | Value |
|--------|--------|--------|-------|
| CODE 2 | | | |
| 0 | 0 | 0 | v |
| 0 | 1 | 0 | v' |
| 1 | 0 | 1 | v' |
| 1 | 1 | 1 | v |
| CODE 3 | | | |
| 0 | 0 | 0 | v |
| 0 | 0 | 1 | v' |
| 1 | 1 | 0 | v' |
| 1 | 1 | 1 | v |

Consider now the following protocol which is presented in pseudocode form to illustrate and describe a procedure for sending a message having a value w from one to another of the processors 20 and 30 using the three vertex-disjoint data paths illustrated in FIG. 1. In the protocol, the designations S and R are not intended to effect a unidirectional signal path. Instead, all processors would be programmed to execute the entire protocol as both sender and receiver. As indicated, the protocol may be incorporated in a program including a series of executable instructions prepared using any of a number of conventional programming languages.

In the protocol, the message w may be any value. However, in the following discussion, w is understood to represent a single bit of information whose value may be 1 or 0. The single-bit value w may be part of a series of bits representing information to be transferred between S and R. As used below, a "codeword" represents a three-bit sequence or encoded representation of the single bit message w, each codeword bit being carried by one of the wires for parallel transmission of all three bits.

The values Fault and NewFault are flags indicating the presence of a faulty wire. A fault exists when a wire changes or "flips" its bit during transmission of the message. Any given wire may exhibit four possible behavior patterns during transmission from S to R, two of which represent a fault situation. In addition, if no message is received, the missing bit is treated as a "0." The protocol assumes that at most one wire is faulty. If more than one wire is faulty, the three path network will be incapable of sending a message and an error will result.

The term "$p_1p_2p_3$" represents a random three-bit codeword transmitted over the wires. The term "p" represents a single bit value corresponding to the codeword $p_1p_2p_3$. The term $q_1q_2q_3$ is the codeword received by R when S transmits $p_1p_2p_3$. Randomness is achieved using the pseudo random number generator 160 as shown in FIG. 1. Each processor 20 and 30 is shown as including a pseudo random number generator 160 because it is assumed that each processor is programmed to function as both a Sender and a Receiver. It will be understood, however, that random number generation is necessary only during the Send mode.

PROTOCOL TO SEND VALUE W

PHASE 1
S:  Randomly choose x = $x_1x_2x_3$, one of the two
    CODE1 codewords corresponding to the value
    w, and y = $y_1y_2y_3$, one of the two CODE2
    codewords corresponding to w.
    Send $x_i/y_i$ over Wire_i, $1 < = i < = 3$
R:  Set a flag, Fault := false;
    For $1 < = i < = 3$, let $a_i/b_i$ denote the two
    bits received over Wire i (missing bits are
    treated as 0's)
    IF $a_1a_2a_3$ is a codeword of CODE1 corresponding to a value A AND
        $b_1b_2b_3$ is a codeword of CODE2 corresponding to a value B AND
        A = B, THEN set w:=A;
    ELSE IF
        $a_1a_2a_3$ is a codeword of CODE1 corresponding to a value A AND
        $b_1b_2b_3$ is a codeword of CODE2 corresponding to a value B AND
        A not equal B,
        THEN set Fault :=true; Send "Wire 3 is good"
            over the public channel
    ELSE IF
        $b_1b_2b_3$ is NOT a codeword of CODE2,
        THEN set Fault :=true; Send "Wire 2 is good"
            over the public channel
    ELSE IF
        $a_1a_2a_3$ is NOT a codeword of CODE1
        THEN set Fault :=true; Send "Wire 1 is good"
            over the public channel
    FI
PHASE 2
S:  IF no message received over the public channel in
        previous phase
    THEN set Fault :=false;
    ELSE let Wire i be the good wire found by R in
        previous phase.
        Choose a random value p in v, v', and choose
        a random encoding $p_1p_2p_3$ of p in CODEi,
        the code with Wire i as flipper and send $p_j$
        on wire j, $1 < = j < = 3$;
    FI
R:  Set NewFault :=false;
    IF Fault = false, THEN do nothing;
    ELSE let $q_1q_2q_3$ be received over wires 1-3
        respectively and let Wire i be the good wire
        found in previous phase.
        IF $q_1q_2q_3$ is a codeword in CODEi, THEN
            let p be the corresponding value;
        ELSE send the 3-bit vector ($q_1q_2q_3$) over
            the public channel and set NewFault :=true;
    FI
PHASE 3
S:  IF Fault = false THEN do nothing;
    ELSE IF no message received from R in PHASE 2,

```
                PROTOCOL TO SEND VALUE W

THEN send XOR(p,w) over the public channel;
            ELSE find the unique j such that p_j not
                equal q_j and send "Wire j faulty" over the
                public channel;
                Choose random w_1 w_2 such that
                w = XOR(w_1 w_2) and send w_i over Wire
                ((j − 1 + i)(mod3) + 1), i = 1, 2.
            FI
    R:  IF NewFault = false THEN let x be the value
            received over the public channel; set
            w = XOR(p,x);
        ELSE set w = XOR(w_1 w_2), where w_i is the
            value received on Wire ((j − 1 + i)(mod3) + 1),
            i = 1, 2 and j is the wire announced faulty by
            S in the current phase.
        FI
End of Protocol
```

In accordance with the above protocol, a single-bit message w is transmitted in secrecy (as a codeword) and the integrity of the wires is tested to determine that the message w has been received correctly. It will be noted that the processors S and R may be synchronized for communications over the network using a conventional handshaking arrangement to control data transfer therebetween. Alternatively, in a preferred implementation, a transmission-response delay would follow each communication to await an appropriate response.

Assuming an initial transmission time of $T_o$, and a predetermined upper time limit D required for a message to be transmitted and received between S and R, the maximum time to transfer a message under ideal conditions will be $T_o + D$. Thus, R waits in the worst case until $T_o + 2D$ before taking action following a secret message from S. That is because of the possibility that in sending a secret message, one of the paths is delayed in transferring its message bit. More precisely, R waits a maximum D time from the moment it receives two bits of information on the second of two paths to see if anything is coming on the third path. If the original transmission was at $T_o$, then since two paths are non-faulty, R will hear on two distinct paths no later than at time $T_o + D$. However, R does not know $T_o$, thus when it hears on two paths it does not know if the time is very close to $T_o$ or very far ($T_o + D$), so it waits an additional D time to be sure it has heard on all non-faulty paths.

Because the response of R is always a public message, S need only wait an additional time interval D before taking action after R has processed and responded to the secret message from S. The maximum processing time required by R is known by S to be $T_R$. Thus, if a secret message is sent by S at time $T_o$, S will not take further action until $T_o + 3D + T_R$. If S sends a public message, the time delay until further action is $T_o + 2D + T_R$.

Figure 2:
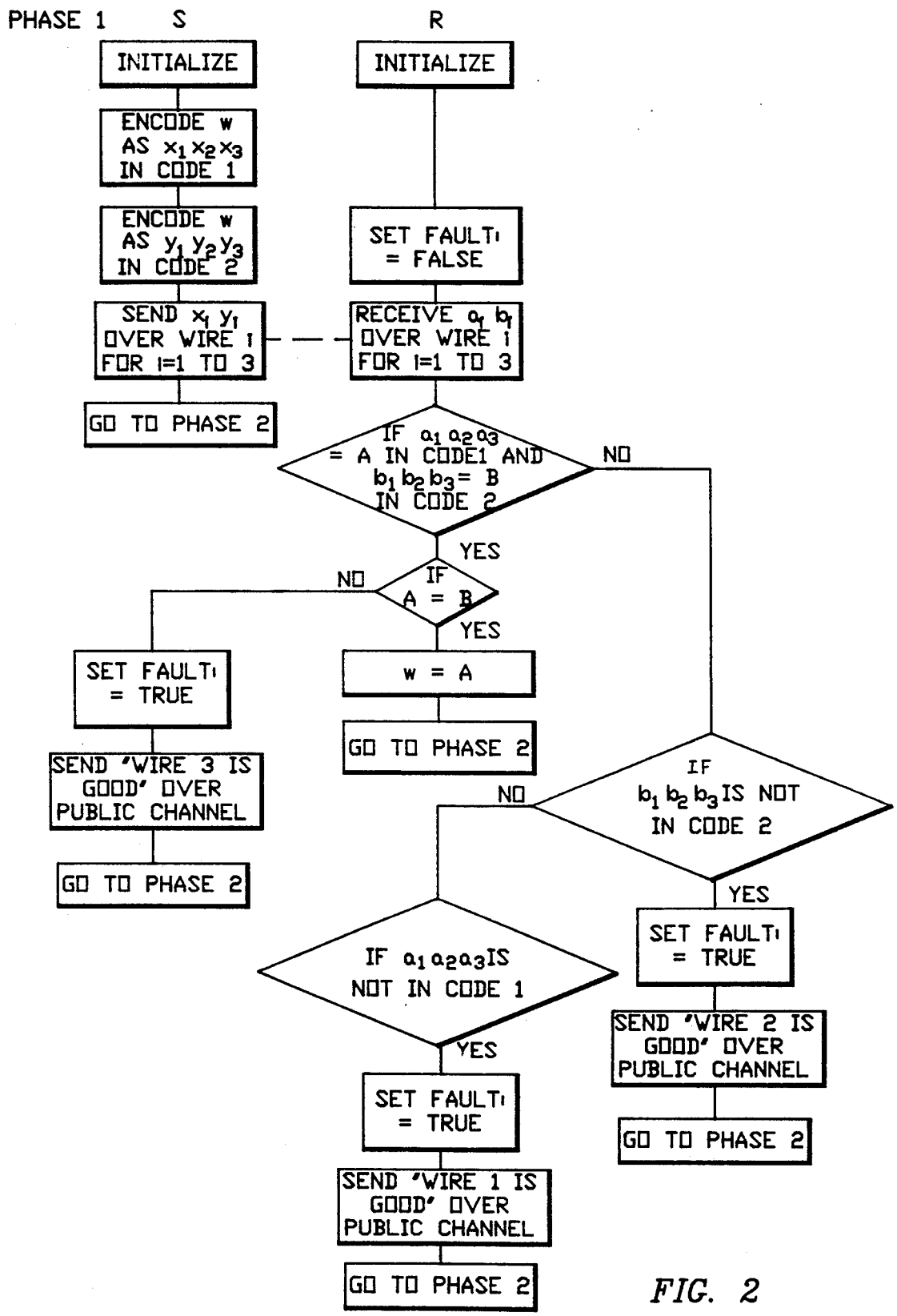
FIG. 2 is a flow diagram of a first phase of a process protocol for controlling the apparatus of FIG. 1 to transfer a message.
Figure 3:
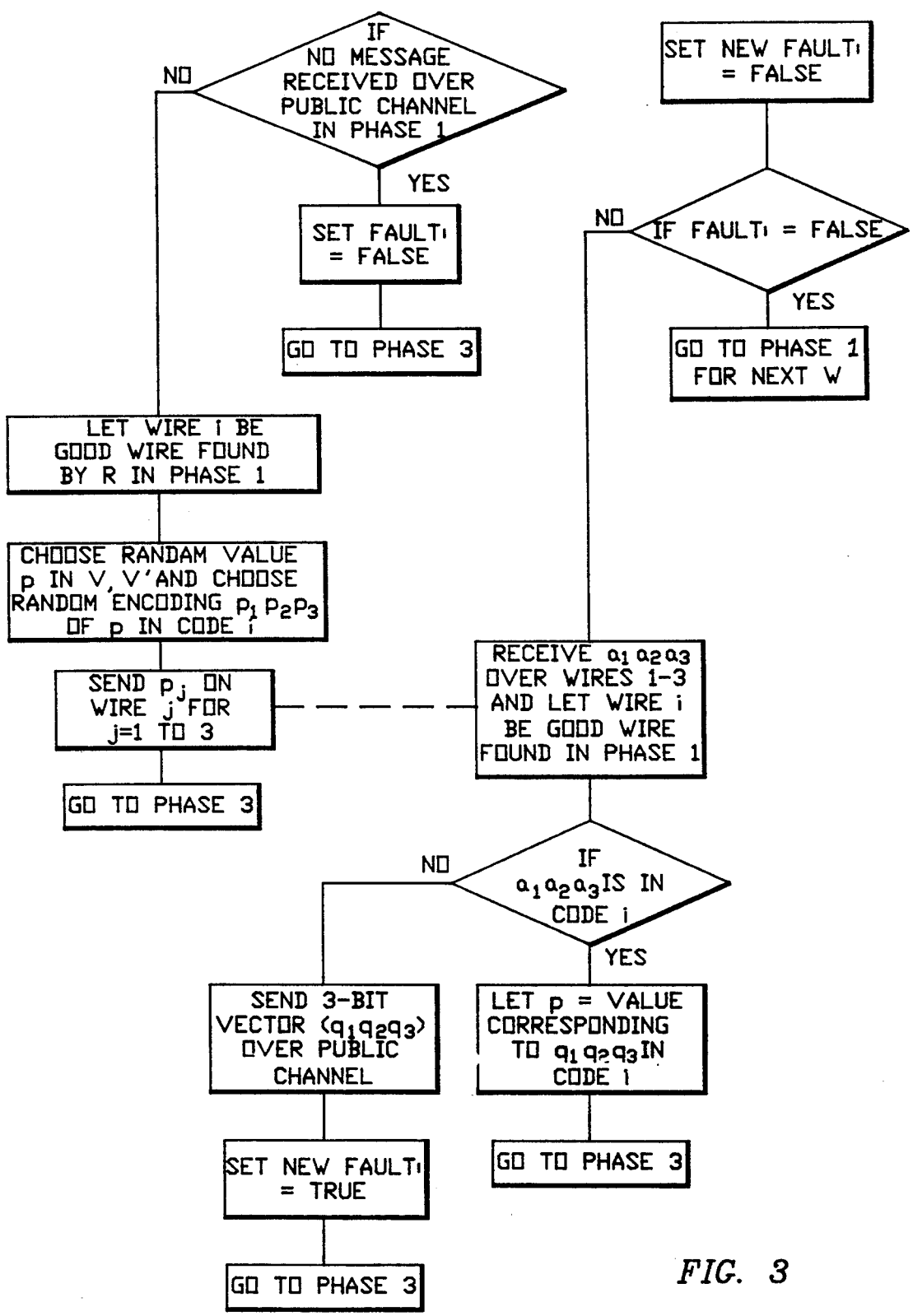
FIG. 3 is a flow diagram of a second phase of the protocol process shown in FIG. 2.
Figure 4:
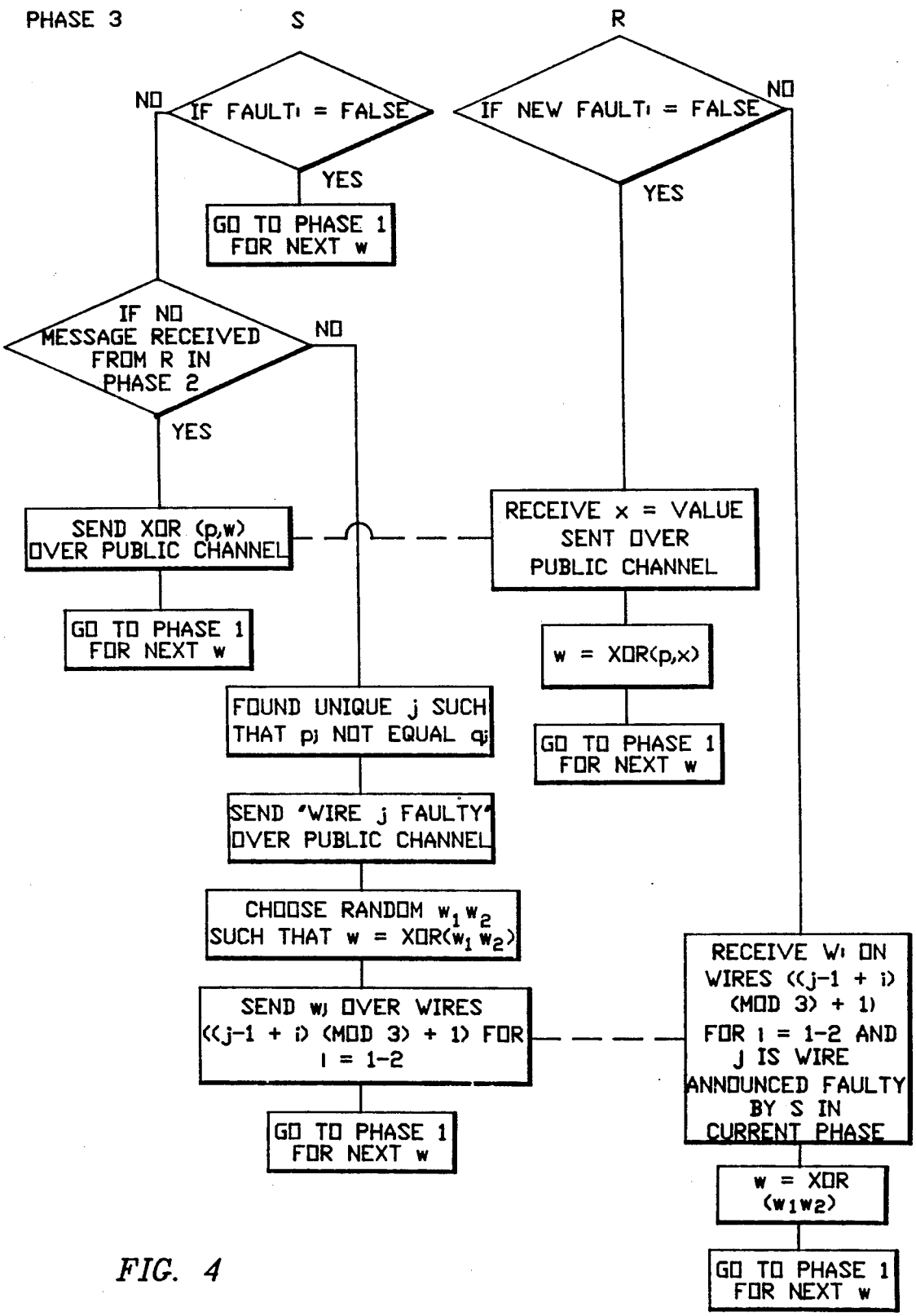
FIG. 4 is a flow diagram of a third phase of the protocol process shown in FIGS. 2 and 3.

The flow diagrams of FIGS. 2, 3 and 4 illustrate the sequence of steps undertaken to send and receive, respectively, the message w between processors S and R in accordance with the protocol. As shown in FIG. 2, the processor S first executes a conventional power-up and initialization sequence. Thereafter, it is assumed that S is ready to send a message to processor R, the message having one or more message bits w. Starting with the first message bit w, S encodes w as a three-bit codeword $x_1 x_2 x_3$ in CODE1. S then encodes w as a three-bit codeword $y_1 y_2 y_3$ in CODE2. For each wire i, S sends sequential bits $x_i y_i$ of the codewords previously encoded at time $T_o$. PHASE 1 processing by S terminates at time $T_o + 2D$ and S waits until time $T_o + 3D + T_R$ before commencing PHASE 2.

In PHASE 2, processor S tests to determine whether a public message was received from processor R over the public channel during PHASE 1. If no public message was received, S sets the Fault flag to false, indicating that the secret message w was received correctly. Thereafter, processor S commences PHASE 3 execution. If S did receive a public message from R in PHASE 1, the secret message w was received incorrectly, and the public message represents the identification of a non-faulty wire i. Using that information, processor S selects a random value p in v, v' and randomly encodes the value p to form a three-bit codeword $p_1 p_2 p_3$ in Code i. S sends that codeword over wires 1–3 to processor R. S waits a further time interval $3D + T_R$ before commencing PHASE 3. PHASE 2 execution terminates.

In PHASE 3, processor S tests to determine whether the Fault flag is false. If so, indicating that the secret message w was correctly received by R in PHASE 1 and that no faulty wires were detected, S returns to PHASE 1 for transmission of the next message w. If the Fault flag is true, indicating the detection of a bad wire in PHASE 1, S tests to determine whether a message was received from processor R in PHASE 2. If no message was received, S sends the result of an Exclusive-OR comparison of the value p and the message w over the public channel. Thereafter, processor S returns to PHASE 1 execution for transmission of the next message bit w. If a message was received from R in PHASE 2, that message will be a three-bit vector $q_1 q_2 q_3$ resulting from a faulty transmission of $p_1 p_2 p_3$ by S. Processor S compares the codeword $p_1 p_2 p_3$ with the received codeword $q_1 q_2 q_3$ sent by R and finds a unique wire j such that $p_j$ is not equal to $q_j$. S sends a message over the public channel stating that the identified wire j is faulty. S then chooses random one-bit values $w_1 w_2$ such that the message w equals the result of an Exclusive-Or comparison of $w_1 w_2$. S sends the values $w_1 w_2$ over the remaining non-faulty wires. S then returns to PHASE 1 execution for transmission of the next message bit w.

As shown in FIGS. 2, 3, and 4, the receiving processor R operates in accordance with the following sequence. In PHASE 1 execution, R executes a conventional start-up initialization procedure. It sets the Fault flag to false and awaits receipt of the two codewords corresponding to the message w transmitted by S in PHASE 1. Upon receipt of two message bits each on two wires R waits a maximum time interval of D for the last pair of message bits (on the third wire). The received codewords are designated $a_1 a_2 a_3$, equal to the value A, and $b_1 b_2 b_3$, equal to the value B. R first tests the received codewords to determine whether they are codewords in CODE1 and CODE2. If they are, R tests to determine whether the values A and B are equal. If so, R equates the message w with the value A and commences PHASE 2 execution. If the values A and B are not equal, R sets the Fault flag to true and sends a message indicating that wire 3 is good over the public channel to processor S. PHASE 2 execution then commences.

If R determines that the received code word $a_1 a_2 a_3$ is not in CODE1 or the codeword $b_1 b_2 b_3$ is not in CODE2, the processor tests whether the codeword $b_1 b_2 b_3$ is NOT in CODE2. If so, the Fault flag is set to true and a message indicating that Wire 2 is good is sent over the public channel to processor S. PHASE 2 execution then commences.

If processor R determines that $a_1a_2a_3$ is not in CODE1 or $b_1b_2b_3$ is not in CODE2, R tests to determine whether the codeword $a_1a_2a_3$ is not in CODE1. If so, the Fault flag is set to true and a message indicating that wire 1 is good is sent over the public channel to processor S. PHASE 2 execution then commences.

In PHASE 2 execution, R sets the NewFault flag to false. It then tests to determine whether the Fault flag is false. If so, R returns to PHASE 1 execution to receive a new message w. If the Fault flag is true, R waits for and then tests the codeword $q_1q_2q_3$ from S to determine whether the codeword is in CODEi, where i is the wire determined to be good in PHASE 1. If $q_1q_2q_3$ is in CODEi, indicating that there are no identified faulty wires, R determines the value p corresponding to $q_1q_2q_3$ in CODEi. PHASE 3 execution then commences. If $q_1q_2q_3$ is not in CODEi, indicating the presence of a faulty wire other than WIRE i, R sends the three-bit vector $q_1q_2q_3$ to S over the public channel. It then sets the NewFault flag to true and commences PHASE 3 execution.

In PHASE 3, R tests to determine whether the New-Fault flag is false. If it is, indicating that no faulty wires were identified in PHASE 2, R equates the message w with the result of an Exclusive-OR comparison of the value p and the value x received from processor S over the public channel. The value x is the result of the Exclusive-Or comparison of p and w sent by S in PHASE 3. Execution then returns to PHASE 1 for receipt of the next message w. If the NewFault flag is true, indicating the presence of a faulty wire, processor R equates the message w with the result of an Exclusive-OR comparison of the values $w_1w_2$ received from the processor S in PHASE 3 over the non-faulty wires identified by S. Execution then returns to PHASE 1 for receipt of the next message w.

An advantage of the above-described protocol is the minimal number of communication bits required to transmit a single bit of data w. It will be appreciated that in the failure-free case, only six bits of communication are necessary to send $a_1a_2a_3$ and $b_1b_2b_3$ in PHASE 1. In the worst case, thirty-two bits of communication are necessary. Six bits are required to send $a_1a_2a_3$ and $b_1b_2b_3$ in PHASE 1. Six bits are required to send "Wire j is good" in PHASE 1 by sending j (which takes two bits) over each of the three wires. Three bits are required to send $p_1p_2p_3$ and nine bits are required to send $q_1q_2q_3$ (over the public channel) in PHASE 2. Six bits are used to send "Wire j is faulty" in PHASE 3. Two bits are required to send $w_1w_2$ in PHASE 3. Note that two bits can be eliminated for a total of thirty bits, by optimizing the transmission of "Wire j is faulty" by not sending that message over the faulty wire j. The maximum number of bits sent over any wire is two in the failure-free case and nine in the worst case.

PROOF OF CORRECTNESS

There are two assertions to be proved: that secrecy is maintained with respect to any single wire, and that the message is correctly transferred from S to R, both under the assumption that at most one wire is faulty.

1. Assertion (a) No faulty wire ever learns the secret message w.

(b) If faults occur independent of the bits transmitted on the faulty wire, then no non-faulty wire ever learns the secret message w.

Proof (a) First, examining the codes, Codei is the code in which Wire i is the flipper. There are exactly two codewords corresponding to each value in the message space. For each value v and each Wire i the probability that in transmitting a codeword corresponding to v a 1 is sent over Wire i is exactly $\frac{1}{2}$, so there is no information in the bit sent over Wire i in a single transmission. Moreover, every time a new codeword is chosen, it is chosen independently of previous codewords. Thus, each of the four possible pairs of bits vv' sent in PHASE 1 over Wire i appears with probability $\frac{1}{4}$, regardless of the value of w, the secret S wishes to transmit.

A faulty wire has four basic behavior patterns in which it can engage in PHASE 1, according to whether or not it interferes with the transmission of each of its two bits. In each case, it completely determines the public message sent by R at the end of PHASE 1, so there is no additional information about w gained by any wire by studying R's response.

In PHASE 2, by the properties of Codei, the faulty wire learns nothing about w from the random pad p sent to R. This time the faulty wire is not a flipper so the faulty wire completely determines whether or not R detects a failure. If R detects a failure, the information it sends over the public channel is information about p, which is random and independent of w. Thus, again the faulty wire learns nothing about w.

In PHASE 3, if the pad p was destroyed in PHASE 2, then the faulty wire is not used at all. If p was successfully transmitted, then the Exclusive-Or value p $\oplus$ w is sent over the public channel. In this case, the security of w follows from the security of p. This completes the proof of Assertion 1(a).

(b) Fix a non-faulty wire z. The argument that z learns nothing about the secret w from the initial transmissions of w according to Code i, $i = 1, 2$, is the same as the corresponding argument for the faulty wire. Since by assumption the faulty wire disrupts independent of the bits transmitted over it in PHASE 1, each non-faulty wire z learns nothing from the existence or absence of an error about the bits sent over any other wire. Thus in PHASE 1, wire z learns nothing about the secret w.

A similar argument applies to PHASE 2. In particular, the absence of disruption in PHASE 2 yields no information to non-faulty wire z about the bit in the encoding of p sent over any wire other than z itself.

Finally, in PHASE 3 if the transmission of p was not disrupted in PHASE 2 then the secrecy of p guarantees the secrecy of w when p $\oplus$ w is transmitted over the public channel. If transmission of p was disrupted in PHASE 2, then the information sent over wire z in PHASE 3 is distributed uniformly at random from $\{0,1\}$, so again wire z learns nothing about the secret w. This completes the proof of Assertion 1(b).

2. Assertion w is correctly transferred in the presence of a single faulty wire.

Proof

If a faulty wire is a flipper, its misbehavior will not be detected. If it is not a flipper, misbehavior will be detected, although R may not know which of the two non-flippers is faulty. Thus, if codewords corresponding to the same value are sent using two different flippers, and decoding yields the same value in both cases. This must be the actual value sent. Thus, if R finishes PHASE 1 with fault =false, R has correctly received w.

If CODE1 and CODE2 codewords corresponding to two different values are received then the fault must be one of the flippers, Wires 1 and 2, so Wire 3 is not faulty. If a non-codeword is received in CODEi then Wire i, the flipper in Code i, is correct. Thus in any of the three cases in which fault is set to true, a good wire is correctly found.

Assuming R finished PHASE 1 with fault =true, if in PHASE 2 NewFault remains false, then since the flipper is good in the code used in PHASE 2, the pad p is correctly received. However, if NewFault becomes true, then S can correctly identify the faulty wire by the information it receives from R over the public channel.

Assuming R finishes PHASE 2 with NewFault =true, S informs R of which wire is faulty, so R only takes further information from the two correct wires. In that case, it receives over those wires precisely what was sent: two bits that sum(mod2) to w.

Accordingly, there has been described a preferred embodiment of a system for secure and private communication in a triple-connected network. While embodiments have been shown and described, it should be understood that modifications and adaptations thereof will occur to persons skilled in the art. Therefore, the protection afforded the invention should not be limited except in accordance with the spirit of the following claims and their equivalents.

We claim:

1. A method for the private and secure communication of a message over at least three data paths, comprising the steps of:
    transmitting a message in coded form over three of said data paths;
    determining whether the message is correctly received;
    if the message is not correctly received, testing the data paths to identify a faulty data path;
    transmitting the message in coded form over the remaining non-faulty data paths; and
    said method steps being performed in three phases wherein a single bit message is transmitted in a fault-free environment using not more than six communication bits and in a faulty environment of a single faulty wire, using not more than thirty-two communication bits.

2. The method of claim 1 wherein the message is initially transmitted as two codewords over said data paths, and wherein the message is determined to be correctly received if said codewords are not altered during transmission.

3. The method of claim 2 wherein each of said codewords has elements corresponding to said data paths and a faulty path is identified by first identifying a non-faulty data path by testing said codewords to determine elements thereof that were not altered during the transmission of said codewords.

4. The method of claim 3 wherein said codewords are selected from codes corresponding to said data paths, said codes being formulated such that the alteration of one of said transmitted codewords due to a fault in a corresponding data path will not be detected while an alteration of one of said codewords due to a fault in a noncorresponding data path will be detected, and wherein a non-faulty data path is identified by determining whether either of said codewords are altered during transmission so as not to remain as part of a corresponding code.

5. The method of claim 4 wherein following identification of a non-faulty data path, remaining data paths are tested by transmitting a random codeword from a code corresponding to the non-faulty data path.

6. The method of claim 5 wherein following identification of a non-faulty data path, the message is transmitted in a first coded form if no remaining faulty data paths are found and a second coded form if a remaining faulty data path is found.

7. The method of claim 6 wherein the message is transmitted in said first coded form by transmitting the result of an Exclusive-OR comparison of a value corresponding to said random codeword and the message, and deriving the message as the result of an Exclusive-OR comparison of said transmitted result and said random codeword value.

8. The method of claim 6 wherein the message is transmitted in said second coded form by selecting a pair of random values such that the result of an Exclusive-OR comparison of said values is the message, transmitting said values over the remaining non-faulty data paths and deriving the message as the result of an Exclusive-OR comparison of said random values.

9. The method of claim 6 wherein the message is transmitted in said first and second coded forms using the results of logical operations.

10. In a digital processing network, a method for the private and secure communication of a message between first and second non-faulty, non-adjacent network nodes connected by at least three vertex-disjoint data paths, comprising:
    transmitting over three data paths a first three digit codeword corresponding to a message to be communicated, said first codeword utilizing a first one of said data paths as a first flipper wire;
    transmitting over said three data paths a second three digit codeword corresponding to the message, said second codeword utilizing a second one of said data paths as a second flipper wire;
    receiving said first and second codewords and interpreting one of said codewords as the message if said first and second received codewords are equal, and if not equal, testing said first and second received codewords to identify a non-faulty data path;
    if a non-faulty data path is identified, transmitting over said data path a random three digit codeword utilizing said identified non-faulty path as a flipper wire;
    receiving said random codeword and testing said received random codeword to identify a faulty data path other than said nonfaulty data path;
    if no faulty data path is identified, transmitting a first result of an Exclusive-OR comparison of a value corresponding to said random codeword and the message, and if a faulty data path is idendified, transmitting two random digits over the remaining non-faulty data paths, said random digits being selected such that the result of an Exclusive-OR comparison therebetween is equal to the message;
    if no faulty data path is identified, receiving said first Exclusive-OR comparison result and determining the message as a second result of an Exclusive-OR comparison of said first result and said random codeword value, and if a faulty data path is identified, receiving said two random digits and determining the message as the result of an Exclusive-OR comparison of said random digits.

11. The method of claim 10 wherein the digits of said codewords correspond to said data paths and said non-faulty path is identified by comparing said codewords to determine common digits thereof that were not altered during the transmission of said codewords.

12. The method of claim 11 wherein said codewords are selected from codes corresponding to said data paths, said codes being formulated such that the alteration of a digit of said transmitted codewords due to a fault in a flipper wire data path will not be detected while an alteration of a digit of said codewords due to a fault in a non-flipper wire data path will be detected, and wherein a non-faulty data path is identified by determining whether either of said codewords are altered during transmission so as not to remain as part of a corresponding code.

13. The method of claim 12 wherein each said code has four possible codewords defining two possible values.

14. The method of claim 13 wherein said values are the inverse of each other.

15. A system operable in conjunction with a digital processing aparatus to provide secure and private communication between non-faulty, non-adjacent nodes connected by at least three vertex-disjoint data paths, said system comprising:
a data storage medium operable in conjunction with a data storage system of said digital processing apparatus;
said data storage medium having resident thereon security procedure means executable on said digital processing apparatus for:
transmitting over three data paths a first three digit codeword corresponding to a message to be communicated, said first codeword utilizing a first one of said data paths as a first flipper wire;
transmitting over said three data paths a second three digit codeword corresponding to the message, said second codeword utilizing a second one of said data paths as a second flipper wire;
receiving said first and second codewords and interpreting one of said codewords as the message if said first and second received codewords are equal, and if not equal, testing said first and second received codewords to identify a non-faulty data path;
if a non-faulty data path is identified, transmitting over said three data paths a random three digit codeword utilizing said identified non-faulty path as a flipper wire;
receiving said random codeword and testing said received random codeword to identify a faulty data path other than said nonfaulty data path;
if no faulty data path is identified, transmitting a first result of an Exclusive-OR comparison of a value corresponding to said random codeword and the message, and if a faulty data path is idendified, transmitting two random digits over the remaining non-faulty data paths, said random digits being selected such that the result of an Exclusive-OR comparison therebetween is equal to the message;
if no faulty data path is identified, receiving said first Exclusive-OR comparison result and determining the message as a second result of an Exclusive-OR comparison of said first result and said random codeword value, and if a faulty data path is identified, receiving said two random digits and determining the message as the result of an Exclusive-OR comparison of said random digits.

16. The system of claim 15 wherein the digits of said codewords correspond to said data paths and said non-faulty path is identified by comparing said codewords to determine common digits thereof that were not altered during the transmission of said codewords.

17. The system of claim 16 wherein said codewords are selected from codes corresponding to said data paths, said codes being formulated such that the alteration of a digit of said transmitted codewords due to a fault in a flipper wire data path will not be detected while an alteration of a digit of said codewords due to a fault in a non-flipper wire data path will be detected, and wherein a non-faulty data path is identified by determining whether either of said codewords are altered during transmission so as not to remain as part of a corresponding code.

18. The system of claim 17 wherein each said code has four possible codewords defining two possible values.

19. The system of claim 18 wherein said values are the converse of each other.

20. A digital data processing apparatus for providing secure and private communication between first and second non-fault, non-adjacent nodes coupled by at least three vertex-disjoint data paths, the digital data processing apparatus comprising:
a data storage medium operating in conjunction with a data storage system of the digital data processing apparatus;
security means for effecting the secure and private communication of a message w, said security means including:
a) means for sending first and second codewords from the first node across the data paths to the second node, the first and second codewords each corresponding to the message w in respective first and second codes;
b) means for receiving the first and second codewords from the data paths and for determining values of the first and second codewords and validity of the first and second codewords within the first and second codes, respectively;
c) means for determining from the values and validity of the first and second codewords whether the first and second codewords were sent over the data paths without error, and for determining, if an error occurred in transmission of the first and second codewords, a data path which is without error;
d) means for determining the message w from said first or second codewords upon determination that said first and second codewords were sent over the data paths without error;
e) means for transmitting a message identifying the data path determined to be without error upon determination that an error occurred in transmission of the first and second codewords;
f) means for sending a third codeword from the first node across the data paths to the second node following transmission of the message, the third codeword corresponding to a random value p in a respective third code;

g) means for receiving the third codeword from the data paths and determining validity of the third codeword within the third code;
h) means for determining from the validity of the third codeword whether the codeword was sent over the data paths without error;
i) means for determining the value p of the third codeword upon determination that the third codeword was sent over the data paths without error;
j) means for transmitting a third codeword vector corresponding to the received third codeword upon determination that the third codeword was sent over the data paths in error;
k) means for encoding the message w using the value p to generate a first encoding and transmitting the first encoding upon determination that the third codeword was sent over the data paths without error;
l) means for comparing the third codeword with the third codeword vector to determine a faulty data path and transmitting a second random encoding of the message w over the remaining data paths which are good; and
m) means for receiving either of the first and second encodings and for decoding the message w therefrom.

* * * * *